3,416,294
CONTINUOUS SELF-EVACUATING
AIR CLEANER
Stanley R. Holliday, Monticello, Wis., assignor to Rice Filter, Inc., Detroit, Mich., a corporation of Michigan
Filed Aug. 11, 1966, Ser. No. 571,738
10 Claims. (Cl. 55—431)

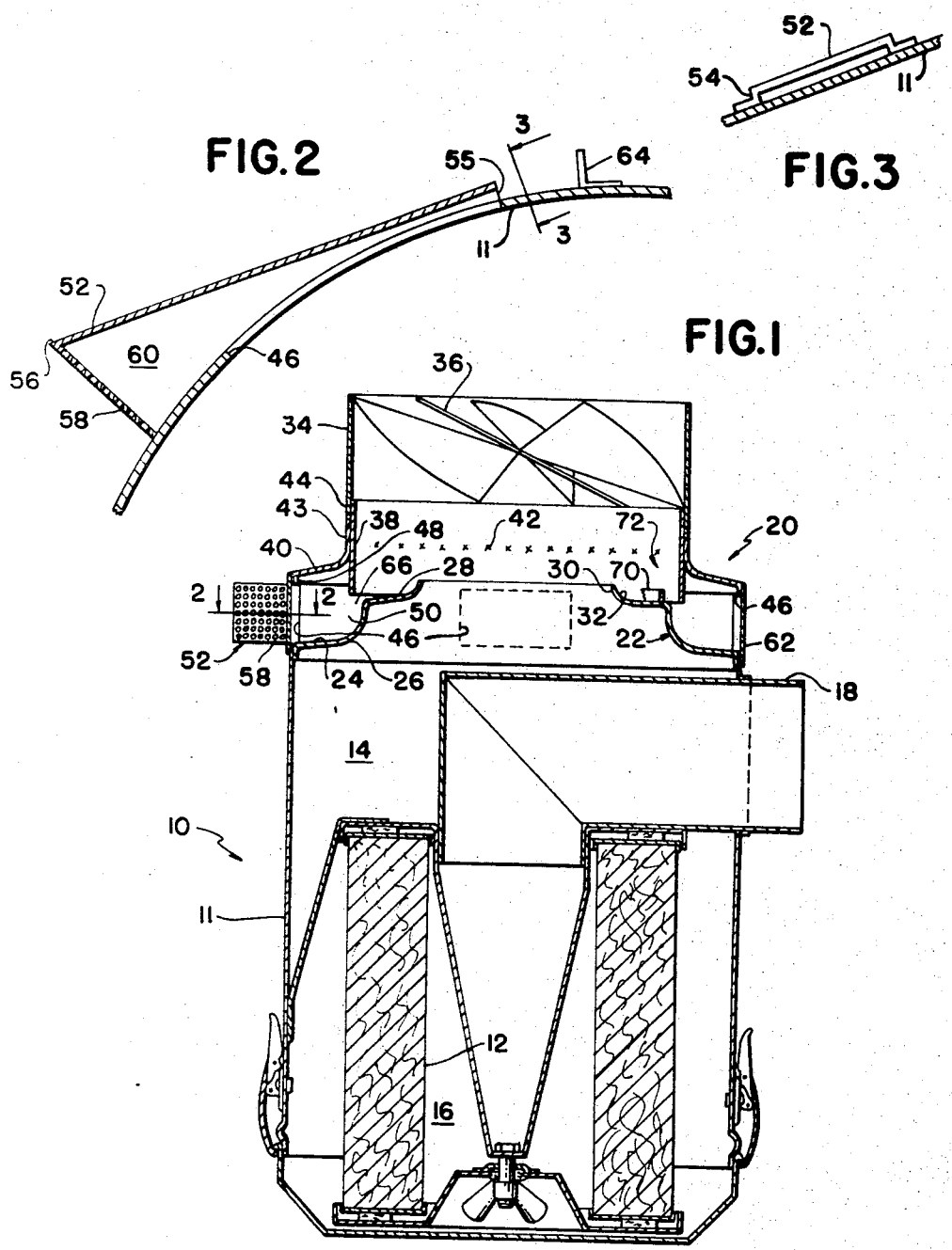

ABSTRACT OF THE DISCLOSURE

An air cleaner adapted to be connected to a vacuum source such as an engine manifold, the cleaner having means for inducing whirling motion of the air drawn through the cleaner, an annular channel for receiving air particles centrifgually separated from the air, at least one radially outwardly facing opening in said channel extending through the side of said cleaner, wall means overlying the opening and defining therewith an elongated chamber of tapered cross-section open at its ends through which air is drawn into the channel substantially tangentially thereof in a direction to assist air circulation around the channel, movement of air circumferentially of said channel causing air particles to be centrifugally ejected through the opening at the small end of said chamber.

---

Air cleaners of the character described herein are useful in a number of different applications, one particular use being to clean or filter air provided for internal combustion engines such for example as heavy duty diesel engines. In many applications, such for example as in tractors and earth moving equipment, the air available for supply to the engine is heavily contaminated with foreign particles such as dust, dirt, sand, and the like. Single stage air cleaners have been employed in which the air is required to pass through a filter but the filter elements or cartridges in heavy duty applications have a relatively short life and quickly become at least sufficiently loaded with dirt to constitute a serious obstacle to adequate air flow to the engine.

In accordance with the present invention a preliminary or first stage air cleaner is provided in association with a conventional air cleaner which thereby constitutes the second stage of a multiple of air cleaners.

It is an object of the present invention to provide an air cleaner comprising means for inducing a swirling motion within a cylindrical passage of the air drawn through the passage so as to provide for centrifugal separation of solid particles, the particles being thrown radially outwardly into engagement with the outer wall of the passage and thence falling into an annular channel from which the particles are ejected by the action of the air passing into the air cleaner.

More specifically, it is an object of the present invention to provide an air cleaner including a centrifugal separator including an annular channel into which solid particles drop upon centrifugal separation from the air stream, and a dynamic particle-ejector associated with the annular channel and effective to induce an air circulation therein and to eject solid particles therefrom.

More specifically, it is an object of the present invention to provide in combination with an annular channel adapted to receive separated particles from an air stream, a particle-ejector comprising means defining a chamber in radial communication with the channel but located radially outwardy therefrom, said chamber being of tapered cross-section and having an enlarged air inlet end and a particle outlet end in the form of a relatively narrow slit, said chamber tapering in the direction of air flow in the channel and effective to induce air flow therein to eject particles through the slit.

Other objects and features of the invention will become apparent as the description proceeds, especially when taken in conjunction with the accompanying drawings, illustrating a preferred embodiment of the invention, wherein:

FIGURE 1 is a vertical section through the multiple stage air cleaner.

FIGURE 2 is a sectional view on the line 2—2, FIGURE 1.

FIGURE 3 is a sectional view on the line 3—3, FIGURE 2.

In the drawings the air cleaner comprises a filter unit indicated generally at 10 including a main casing 11 which may be of conventional construction and which is herein illustrated as incuding a tubular filter cartridge 12. Air entering centrally from the top of the filter passes through the space 14, thence through the filter cartridge into the central space 16 from which it is drawn through the elbow and outlet tube 18. Air filters of this type normally are provided with rain covers (not illustrated herein) to prevent entrance of rain into the main casing. Filters of this type are efficient when the filter element is new but require relatively frequent replacement of filters in order to prevent an accumulation of particles in the filter which tend to restrict flow of air therethrough.

The present invention involves the addition of a first stage air cleaner, indicated generally at 20, in superimposed position on the casing 11. The first stage air filter or cleaner comprises a partition 22 having a substantially horizontal ledge portion 24, an upturned annular portion 26 of arcuate cross-section, an intermediate slightly downwardly and outwardly inclined ledge portion 28, and an upwardly and inwardly curved lip 32 defining an air inlet opening 30 of substantial size and constituting the opening through which all of the air is required to pass.

Above the partition 22 is inlet structure comprising a tubular blade housing 34 receiving a fan shaped baffle 36, the blades of which are inclined at a substantial angle as for example about 25 degrees. Fitted within the lower end of the tubular housing 34 is a sleeve 38 having a downwardly and outwardly flaring adapter 40 attached thereto as for example by spot welding as indicated at 42. The upper edge of a flange 43 abuts against the lower edge of the tubular housing 34 as indicated at 44. The upper end of the housing 11 is provided with a multiplicity of circumferentially elongated openings 46 located above the ledge portion 24 of the partition 22 and located below the lower edge of a cylindrical flange 48 provided at the outer edge of the adapter 40.

When air is drawn through the casing 11 a rapid swirling motion is imparted to the air by the blades or vanes of the fan shaped baffle 36. As a result of this swirling motion solid particles in the air which are denser than the air are caused to move radially outwardly by centrifugal action until they encounter the inner surface of the sleeve 38, and thereupon particles fall into an annular channel 50 formed by the partition 22 and the upper edge portion of the casing 11.

The problem successfully solved by the present invention is the removal of these particles as they are separated from the air stream by centrifugal action and are collected in the annular channel 50, without requiring a power device such as a suction unit for movement of the particles from the channel or ejection of the particles therefrom.

The mechanism which effects this result is best illustrated in FIGURES 2 and 3 where the particle ejector is seen to comprise an outer wall 52 spaced at one end from the outer surface of the upper portion of the casing 11 to define a particle ejection slit 55. The wall 52 as illustrated is flat and is connected to the outer surface of the casing 11 by side walls 54 so as to define a chamber of tapering cross-section, the chamber overlying one of the openings 46 in the relationship best illustrated in FIGURE 2. It will be observed that the arrangement provides a relatively large air inlet end at 56 which is closed by a suitable screen or a perforated closure 58 to prevent the entrance of foreign material into the chamber 60. The particle outlet slit 55 is located at the opposite or smaller end of the tapered chamber.

With the foregoing construction it will be observed that particles striking the inner surface of the sleeve 38 drop into the annular channel 50, whereas the air from which the particles have been thus separated passes through the opening 32 and thence through the filter cartridge 12 and out the outlet tube 18. Air located within the annular channel 50 tends to circulate around the channel but this circulation is at a relatively slow velocity and in fact, may be negligible. However, the presence of the tapered chamber 60 communicating with outside air at atmospheric pressure causes air to flow in through the screen or perforated closure 58 at a relatively large volume. Some air is also drawn in through the particle ejection slit 55 due to the less than atmospheric pressure existing within the interior of the air cleaner. However, the relatively large volume of flow through the large end 56 of the particle ejector induces a substantial circular flow of air in the annular channel 50 and the particles therein when they come into alignment with the opening 46 have a substantial circular velocity sufficient to eject them mechanically through the slit 55. This action takes place even though there is an appreciable inflow of air through the slit 55.

From the foregoing it will be observed that there is provided a self-evacuating first stage air cleaner which requires no external connections or power means or devices for the removal of dirt particles as collected by centrifugal action in the first stage cleaner.

Referring again to FIGURE 1 it will be noted that as illustrated the upper end of the casing 11 is provided with a plurality, herein illustrated as four, openings 46. Excellent results are obtained when a single particle ejector 52 is employed and it may be located in any one of the four positions occupied by the openings 46. The openings not in use are of course closed by removable closures such for example as illustrated at 62. Alternatively however, more than one particle ejector 52 may be employed and under proper conditions each of the four openings 46 may be provided with a particle ejector 52. In fact, in some cases the number of openings provided with particle ejectors may be increased beyond four. When a single particle ejector is employed it will be located in a position such that the particles ejected with considerable velocity are directed in a direction in which they do not interfere with operation of the engine. In the event that a multiplicity of particle ejectors are provided, it will of course be possible to provide deflectors such for example as the plate 64, in position to be impinged by ejected particles.

It will be observed that the lower edge of the sleeve 38 constitutes a baffle which defines with the partition 22 a throat 66 through which the particles are caused to pass when impinged against the inner surface of the sleeve 38 by centrifugal action. The baffle provided by the lower edge of the sleeve 38 tends to prevent displacement of particles back into the air stream as a result of air circulation in the annular channel 50 and particularly resulting from inward flow of air through the opening 46, primarily from the enlarged end 56 of the particle ejector.

In some cases it is desirable to provide a second baffle, a portion of which is herein illustrated at 70 at the right hand side of FIGURE 1, which is in the form of a ring secured adjacent the radially outer edge of the substantially flat ledge portion 28 of the partition 22. With this arrangement the baffle provided by the lower portion of the sleeve 38 and the tubular baffle 70 defines a throat 72 through which particles separated by centrifugal action from the air stream are caused to fall into the annular channel 50. The baffle 70 assists the baffle provided by the lower end of the sleeve 38 in return of particles due to air motion within the annular channel 50.

The aerodynamics of the particle ejection is believed to depend upon the establishment of a relatively high velocity circular flow of air in the substantially closed annular channel 50 principally as a result of air flow into the channel through the relatively large end 56 of the particle ejector. This air flow carries the particles circularly around the channel until they reach the opening 46 at which time they move radially outwardly into the tapered chamber 60 and are ejected at substantial velocity through the slit 55.

The drawings and the foregoing specification constitute a description of the improved air cleaner in such full, clear, concise and exact terms as to enable any person skilled in the art to practice the invention, the scope of which is indicated by the appended claims.

What I claim as my invention is:

1. A self-evacuating air cleaner providing continuous particle ejection without external aspirators, suction devices or the like, said air cleaner comprising a casing of circular cross-section having an outlet opening for connection to an engine manifold or the like to draw air through the casing, said casing having an inlet opening at the top spaced from said outlet and a downwardly extending air passage, means for inducing rapid whirling motion to air drawn downwardly through said passage, means including the whirl-inducing means restricting flow through said passage so that air pressure in said passage is sub-atmospheric, an annular upwardly open channel surrounding said passage in position to receive particles centrifugally separated from the air drawn through said passage, the outer wall of said channel being formed by the side wall of said casing, said channel being in open communication with said passage so that air pressure in said channel is sub-atmospheric, the outer wall of said channel having a radially facing opening therethrough in communication with ambient atmosphere through which outside air is drawn as a consequence of the sub-atmospheric air pressure within said channel, a gradually sloped wall joined to the casing at its top and bottom spaced outwardly from and extending adjacent to said casing overlying said opening and defining with the casing wall surrounding said opening an elongated open-ended ejector chamber extending generally adjacent to said casing and communicating with ambient atmosphere at opposite ends and with said channel through said radially facing opening, said wall being shaped and arranged to form the chamber of tapering cross-section from one end to the other and having open ends both exposed directly to outside atmosphere and through which outside air is drawn into said channel, the tapering cross-section of said chamber being arranged to inject air entering the larger open end of said chamber generally tangentially into said channel in the direction of air circulation therein, the smaller open end of said chamber porviding for continuous ejection of particles from said channel by centrifugal action.

2. An air cleaner as defined in claim 1 in which said channel is provided with a plurality of openings and particle ejectors.

3. An air cleaner as defined in claim 1 in which said channel is formed with a multiplicity of the radially facing openings as aforesaid, and in which particle ejectors are provided in at least one of such openings, and means closing the openings which are not fitted with particle ejectors.

4. An air cleaner as defined in claim 1, said channel being formed in part by an annular partition having its inner edge portions extending radially inwardly into the air passage, and a tubular baffle on the portion of said annular partition within the air passage and extending toward the inlet end of said passage and having a free edge spaced from the edge of said channel.

5. An air cleaner as defined in claim 1, said air passage comprising a vertical casing of circular cross-section, an annular partition in said casing, the outer edge portions of said partition being shaped to form the bottom and inner wall of the aforesaid channel, the inner edge portion of said partition extending inwardly of said channel and constituting a generally horizontal ledge, said casing having an annular baffle having a circular lower edge spaced outwardly of the portion of said partition forming the inner wall of said channel and defining therewith a restricted entry throat into said channel.

6. An air cleaner as defined in claim 5 in which said ledge portion is inclined slightly downwardly and outwardly to facilitate movement of particles into said channel.

7. An air cleaner as defined in claim 5 comprising in addition a second annular baffle extending upwardly from the outer edge of the ledge portion of said partition to define a further restricted entry throat into said channel.

8. An air cleaner as defined in claim 1, in which the opening in said channel is a circumferentially elongated opening, said ejection chamber having its smaller end at the end of said opening toward which air in said channel circulates, the enlarged end of said chamber extending substantially beyond the opposite end of said opening.

9. An air cleaner as defined in claim 8, the particle ejection opening of said chamber being in the form of a narrow slit extending axially of said casing.

10. An air cleaner as defined in claim 9 in which the effective air inlet area at the enlarged end of said particle ejector is at least several times the area of the particle ejection opening.

References Cited

UNITED STATES PATENTS

| | | | |
|---|---|---|---|
| 503,171 | 8/1893 | Shoemaker | 55—335 |
| 1,745,950 | 2/1930 | Orem | 55—448 |
| 1,798,510 | 3/1931 | Winslow et al. | 55—426 |
| 2,096,883 | 10/1937 | Clason | 55—468 |
| 3,061,179 | 10/1962 | Pendleton | 55—468 |
| 3,077,716 | 2/1963 | Wilson | 55—337 |
| 3,173,775 | 3/1965 | Hampton et al. | 55—456 |
| 3,354,621 | 11/1967 | Wilson | 55—510 |

FOREIGN PATENTS 1,320,200  1/1963  France.

HARRY B. THORNTON, *Primary Examiner.*

B. NOZICK, *Assistant Examiner.*

U.S. Cl. X.R.

55—448, 456, 468, 510; 230—95